(12) United States Patent
Yeo et al.

(10) Patent No.: US 7,389,023 B2
(45) Date of Patent: Jun. 17, 2008

(54) METHOD AND APPARATUS FOR FORMING A PHOTONIC CRYSTAL

(75) Inventors: Jong-Souk Yeo, Corvallis, OR (US); Henry D. Lewis, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/082,024

(22) Filed: Mar. 15, 2005

(65) Prior Publication Data
US 2006/0210233 A1    Sep. 21, 2006

(51) Int. Cl.
*G02B 6/00* (2006.01)
*G02B 6/34* (2006.01)
(52) U.S. Cl. .......................................... 385/37
(58) Field of Classification Search ............. 385/14–16, 385/24, 31, 129–132, 147; 372/92–94
See application file for complete search history.

(56) References Cited

U.S. PATENT DOCUMENTS

| 4,058,430 | A | 11/1977 | Suntola et al. | |
|---|---|---|---|---|
| 6,274,293 | B1 * | 8/2001 | Gupta et al. | 430/315 |
| 6,392,787 | B1 * | 5/2002 | Cirelli et al. | 359/321 |
| 6,752,868 | B2 | 6/2004 | Lewis, III et al. | |
| 6,753,250 | B1 | 6/2004 | Hill et al. | |
| 7,031,566 | B2 * | 4/2006 | Kochergin et al. | 385/27 |
| 7,045,052 | B2 * | 5/2006 | Kochergin et al. | 205/656 |
| 2002/0009277 | A1 * | 1/2002 | Noda et al. | 385/130 |
| 2003/0123827 | A1 * | 7/2003 | Salerno et al. | 385/129 |
| 2004/0170352 | A1 * | 9/2004 | Summers et al. | 385/16 |
| 2006/0286488 | A1 * | 12/2006 | Rogers et al. | 430/325 |
| 2007/0196571 | A1 * | 8/2007 | Ozin et al. | 427/199 |

OTHER PUBLICATIONS

Leskela et al., "Atomic Layer Deposition Chemistry: Recent Developments and Future Challenges," Angew.Cem.Int.Ed. 2003, 42, 5548-5554; Wiley-VCH Verlag GmbH & Co. KGaA, Weinheim.
Klaus et al., "Atomic Layer Deposition of Tungsten Using Sequential Surface Chemistry With a Sacrificial Stripping Reaction," Thin Solid Films 360 (2000) 145-153; Elsevier Science S.A.
Campbell et al., "Fabrication of Photonic Crystals for the Visible Spectrum by Holographic Lithography," Nature, vol. 404, Mar. 2, 2000; Macmillan Magazines Ltd.
Shoji et al., "Photofabrication of Three-Dimensional Photonic Crystals by Multibeam Laser Interference Into a Photopolymerizable Resin," Applied Physics Letters, vol. 76, No. 19, May 8, 2000; American Institute of Physics.
Crowell, John E., "Chemical Methods of Thin Film Deposition: Chemical Vapor Deposition, Atomic Layer Deposition, and Related Technologies," J. Vac. Sci. Technol. A 21(5), Sep./Oct. 2003; pp. S88-S95; 2003 American Vacuum Society.
Lin et al., "A Three-Dimensional Photonic Crystal Operating at Infrared Wavelengths," Nature, vol. 394, Jul. 16, 1998, pp. 251-253; Macmillan Publishers Ltd 1998.
Colvin, Vicki L., "From Opals to Optics: Colloidal Photonic Crystals," MRS Bulletin; Aug. 2001; pp. 637-641.

* cited by examiner

*Primary Examiner*—M. R. Connelly-Cushwa

(57) ABSTRACT

Embodiments of methods, apparatuses, devices, or systems for forming a photonic crystal are described.

45 Claims, 4 Drawing Sheets

METHOD AND APPARATUS FOR FORMING A PHOTONIC CRYSTAL

BACKGROUND

Photonic crystals may be utilized in a number of devices, including display devices such as digital projectors, or other light based applications such as reflectors and light emitting diodes, for example. Photonic crystals suitable for use in devices such as these may be formed from a variety of materials or may be formed by use of a variety of processes. Selection of materials or processes may result in the formation of a photonic crystal having particular properties. Formation of photonic crystals may be time consuming, expensive, or may not produce devices having desirable characteristics. It may, therefore, be worthwhile to address one or more of these limitations.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
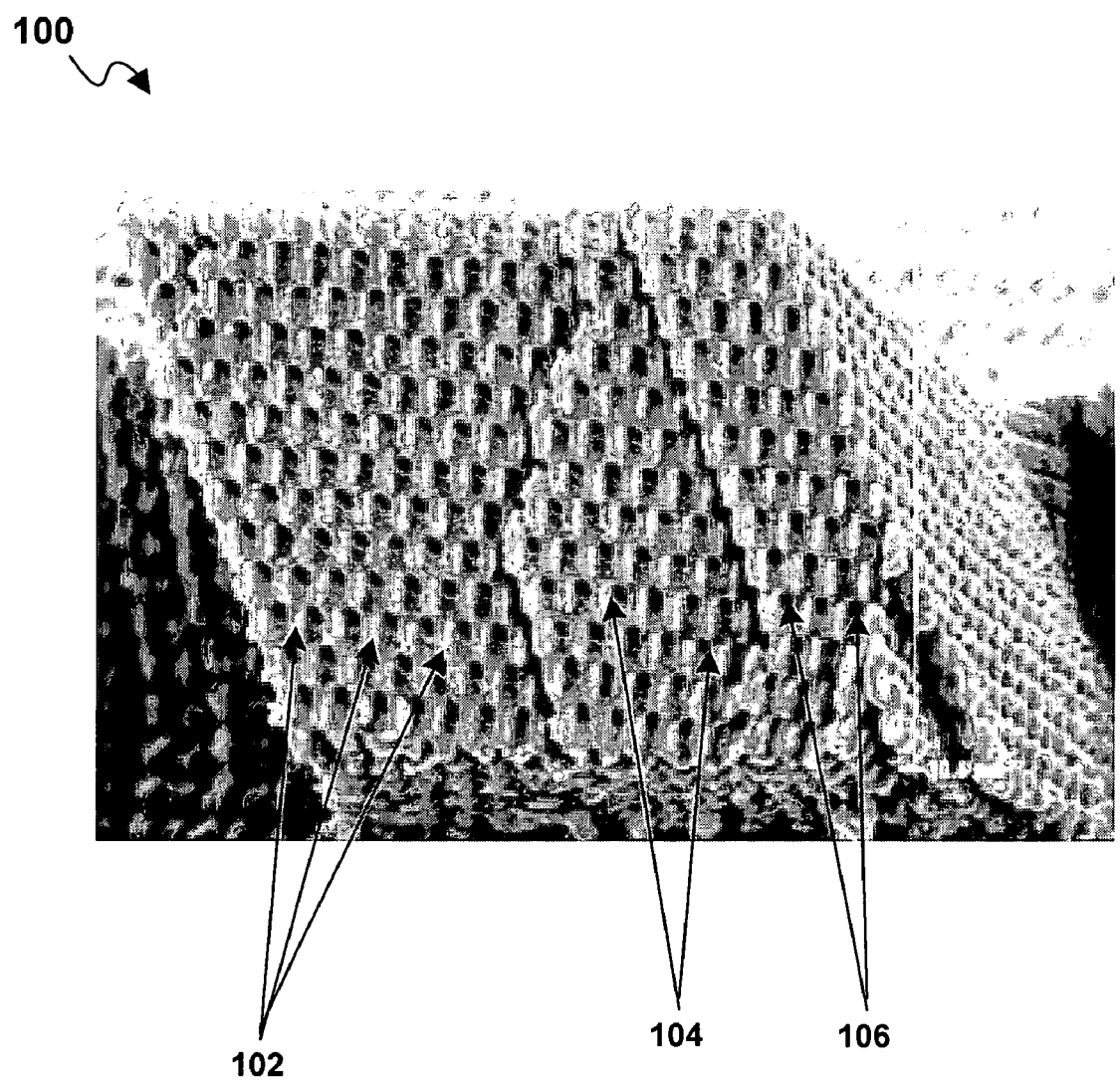
FIG. 1 illustrates an embodiment of a photonic crystal.

In the following detailed description, numerous specific details are set forth to provide a thorough understanding of claimed subject matter. However, it will be understood by those skilled in the art that claimed subject matter may be practiced without these specific details. In other instances, well-known methods, procedures, components or circuits have not been described in detail so as not to obscure claimed subject matter.

Photonic crystals may be formed from one or more materials, and, typically, may be formed such that a periodic variation in the dielectric constant of the material(s) may exist along one or more directions through the crystal. This periodic variation in the dielectric constant may vary on the order of wavelengths of light or fractions of wavelength of light, for example. The periodic variation may result in a photonic crystal having particular optical properties, such as one or more optical modes. A photonic crystal may be configured such that optical modes in one or more directions for one or more wavelengths of light may be modified or suppressed. For example, light having a particular wavelength, or light within one or more bands of wavelengths may not be allowed to propagate through the crystal in one or more directions, and, in at least one context, this capability to suppress light may be referred to as zero spectral emissivity. Additionally, in this context, the one or more wavelengths of light that may not be allowed to propagate through the crystal may be referred to as the band gap of the photonic crystal, which may additionally be referred to as the photonic band gap (PBG). Light, as used in this context, refers generally to electromagnetic radiation within a portion of the electromagnetic spectrum, which includes radiation within the visible portion of the electromagnetic spectrum, having a wavelength substantially within the range of approximately 380 nanometers (nm) to 760 nm, although the claimed subject matter is not so limited. Electromagnetic radiation not within the visible spectrum may be incorporated in at least one embodiment, such as infrared light, which may have a wavelength substantially within the range of 800 to 2000 nm, for example.

Photonic crystals may be utilized in a number of applications. For example, photonic crystals may be utilized in light source applications including digital projector device applications and display applications; integrated circuit applications; light emitting diodes; reflectors, anti-reflectors and modulators; and nanoscopic lasers or photonic sensors, although it is worthwhile to note that these are just a few potential applications, and the claimed subject matter is not limited to any particular application. Additionally, photonic crystals that may be suitable for use in one or more of these applications may comprise numerous materials or may be formed from one or more processes. The particular material or process may depend at least in part on the particular application, for example.

Photonic crystals may be capable of having zero spectral emissivity for one or more wavelengths of light, such as for a band of wavelengths. Additionally, photonic crystals may have zero spectral emissivity in one or more directions or dimensions. A photonic crystal capable of having zero spectral emissivity in two dimensions for light having one or more wavelengths may be referred to as a 2D photonic crystal. Similarly, a photonic crystal capable of eliminating the propagation of light having one or more wavelengths in three dimensions may be referred to as a 3D photonic crystal. Photonic crystals such as 2D or 3D crystals may be capable of having a photonic band gap in one or more directions, wherein light having particular wavelengths may be emitted or suppressed. A 2D photonic crystal may have a 2D photonic band gap, wherein light having a particular wavelength or band of wavelengths may be suppressed in two dimensions. Additionally, the 2D photonic crystal may emit light not within the 2D band gap, which may include visible light or near infrared (IR) light, which may be useful in light source applications, for example. Photonic crystals such as 2D and 3D photonic crystals may be formed from a variety of materials, may be formed into one or more structures, and may be formed by use of one or more fabrications processes. A 3D photonic crystal may comprise one or more materials formed into a particular structure. The one or more materials may be combined to form a particular arrangement of elements, such as a lattice structure. The lattice structure may include a number of layers and arrays, such as several layers of rod arrays which may be capable of suppressing light in three dimensions, for example.

Referring now to FIG. 1, there is illustrated one embodiment of a photonic crystal 100, which may have one or more of the aforementioned properties, such as a photonic band gap for one or more dimensions. Photonic crystal 100 may comprise a plurality of features 102, which may include microstructures or nanostructures, meaning, in this context, that features of the photonic crystal may have dimensions on the order of micrometers or nanometers. The features may be formed in a particular arrangement, such as a periodic arrangement, for example. The features may include one or more surfaces 104. Surfaces 104 may comprise external surfaces, formed on external portions of the crystal, may comprise internal surfaces, or may comprise surfaces that are partially internal and partially external. Internal surfaces may comprise surfaces that are internal relative to external portions of the crystal, for example. The surfaces may define one or more voids 106 that may additionally be internal, external or a combination of the two. Depending on the particular configuration of the surfaces, the one or more voids 106 may comprise a lattice arrangement of voids, for example. Additionally, photonic crystal 100 may have submicron periodicity, meaning, in this context, that photonic crystal 100 may be comprised of a repeating pattern of one or more materials having submicron features. The photonic crystal may be comprised of a combination of materials, such as one or more materials layered on a substrate material, or may be amorphous. Additionally, although illustrated as having a particular shape, it is worthwhile to note that the claimed subject matter is not so limited. For example, features 102 may comprise numerous differing types of shapes, such as rods, hexagons or cubes, and the one or more shapes may be arranged in a particular pattern, such as a "Lincoln log" pattern of alternating arrays of rods, as just an example.

The photonic crystal 100 may be capable of suppressing, amplifying or controlling photons of light, for example. The photonic crystal 100 may be formed from one or more materials, and may be formed by use of one or more methods or processes. For example, in at least one embodiment, photonic crystal 100, and particularly features 102 may be formed from positive or negative photoresist materials including polymers and epoxies, such as SU8, an epoxy based photoresist material. The features 102 may include surfaces 104, and may be formed in the photoresist. The surfaces 104 may define voids 106, and may define an array of voids. The array of voids may be periodic, nonperiodic or a combination of periodic and nonperiodic, for example. The one or more surfaces may have one or more layers of material deposited thereon, and may fill one or more of the voids in at least one embodiment. The layer materials may comprise metals, metal oxides, metal nitrides, II–VI compounds, or III–IV compounds, such as GaAs, InP, InAs, ZnS, CdS, CdTe, W, $W_2N$, TaN, $Ta_2O_5$, or $TiO_2$, to name a few examples, and prior to the deposition of these one or more materials, one or more additional materials such as one or more adhesion promoters may be deposited. One or more layers of adhesion promoter may be deposited if particular materials are utilized, explained in more detail later. However, the claimed subject matter is not so limited, and a photonic crystal in accordance with at least one embodiment may be formed from any material or combination of materials that may be suitable for implementation in a photonic crystal, for example.

Photonic crystals such as photonic crystal 100 may be formed by use of one or more processes, such as a combination of one or more removal and deposition processes. Selection of particular processes may depend at least in part on the one or more materials being utilized to form a photonic crystal, or may depend on the particular characteristics of a photonic crystal being formed. However, in at least one embodiment, a photonic crystal such as illustrated in FIG. 1 may be formed from a combination of at least one laser removal process and at least one material deposition process. For example, in one embodiment, a holographic lithography process in combination with at least one atomic layer deposition (ALD) process may be utilized to form a photonic crystal, although in alternative embodiments differing removal processes may be utilized, such as one or more laser direct write processes, for example. Holographic lithography, in this context, may refer generally to a laser interference process wherein a material may be subjected to electromagnetic radiation, such as laser light. The laser light may be controlled such as by tuning the laser light to have a particular wavelength or a particular angle of incidence with respect to a material, and the laser light may cause portions of the material to be photolithographically removed, and one or more features may be formed, such as one or more surfaces that may define one or more voids. The one or more voids may be defined, or formed, in a particular pattern, such as to form a periodic structure, for example. The removal of selected portions of material may result in the formation of a device having particular dimensions or features. For example, one or more nanostructures or microstructures may be formed in the material(s), and may comprise features that may include surfaces, and the surfaces may define one or more arrays of voids, for example. The nanostructures or microstructures may be formed in a particular arrangement, such as a lattice arrangement, and may form a periodic structure.

Additionally, ALD, in this context, comprises a deposition process wherein a surface, such as internal or external surfaces of a 3D crystal structure formed from photosensitive material may be saturated with one or more materials, such as alternating types of materials. For example, alternating or similar precursor materials may be provided by use of one or more precursor purge processes to result in the materials being deposited on the crystal surfaces. As a result, one or more layers of material may be formed, and may comprise atomic or subatomic layers of material, although the claimed subject matter is not limited in this respect. Precursor materials may include gases, volatile liquids or solids, for example, and may need to be heated to enable deposition if the materials are not in a gaseous state, for example. Additionally, one or more adhesion materials may be utilized to promote adhesion between a photosensitive material and one or more other materials, and may be deposited prior to the deposition of the precursor materials, for example. Use and selection of adhesion materials may depend on the particular precursor material(s) utilized. In one embodiment, gaseous precursor materials may be utilized in an ALD chamber, to form one or more material layers on the crystal surfaces. The precursor materials may be deposited by use of alternating gas pulse/gas purge cycles, for example. The gaseous precursor materials may be at least partially deposited on to one or more surfaces of the crystal, such as to form a thin film of material, which may be a monolayer, submonolayer (which may comprise a portion of a monolayer), or multilayer, for example. The thin film may be formed on external and internal surfaces of the crystal to a substantially uniform thickness, and may fill one or more voids of the crystal in at least one embodiment. ALD may be utilized to deposit conformal layers of material on features formed in photosensitive material, such as nanostructures, and the layers of material may be deposited to a substantially uniform thickness. Multiple material layers may be formed, which may result in the formation of a photonic crystal having particular characteristics, for example. Alternatively, after forming one or more layers of material by use of one or more ALD processes, one or more additional materials may be deposited by use of one or more other deposition processes. For example, one or more layers of material may be deposited by use of ALD. After deposition, one or more additional materials may be deposited on the one or more materials by use of electroplating, for example, and in this embodiment the material(s) deposited by use of ALD may comprise a seed layer for electroplating, for example. ALD also may be utilized to deposit conformal layers of materials at low temperatures (<150° C.) that are compatible with deposition on polymeric substrates or other substrates with glass transition temperature or melting points at low temperatures (<150° C.). However, numerous types and categories of systems may be utilized to perform holographic lithography and ALD, systems suitable for use in one or more embodiments are illustrated in FIGS. 2 and 3, and are explained in more detail below.

Figure 2:
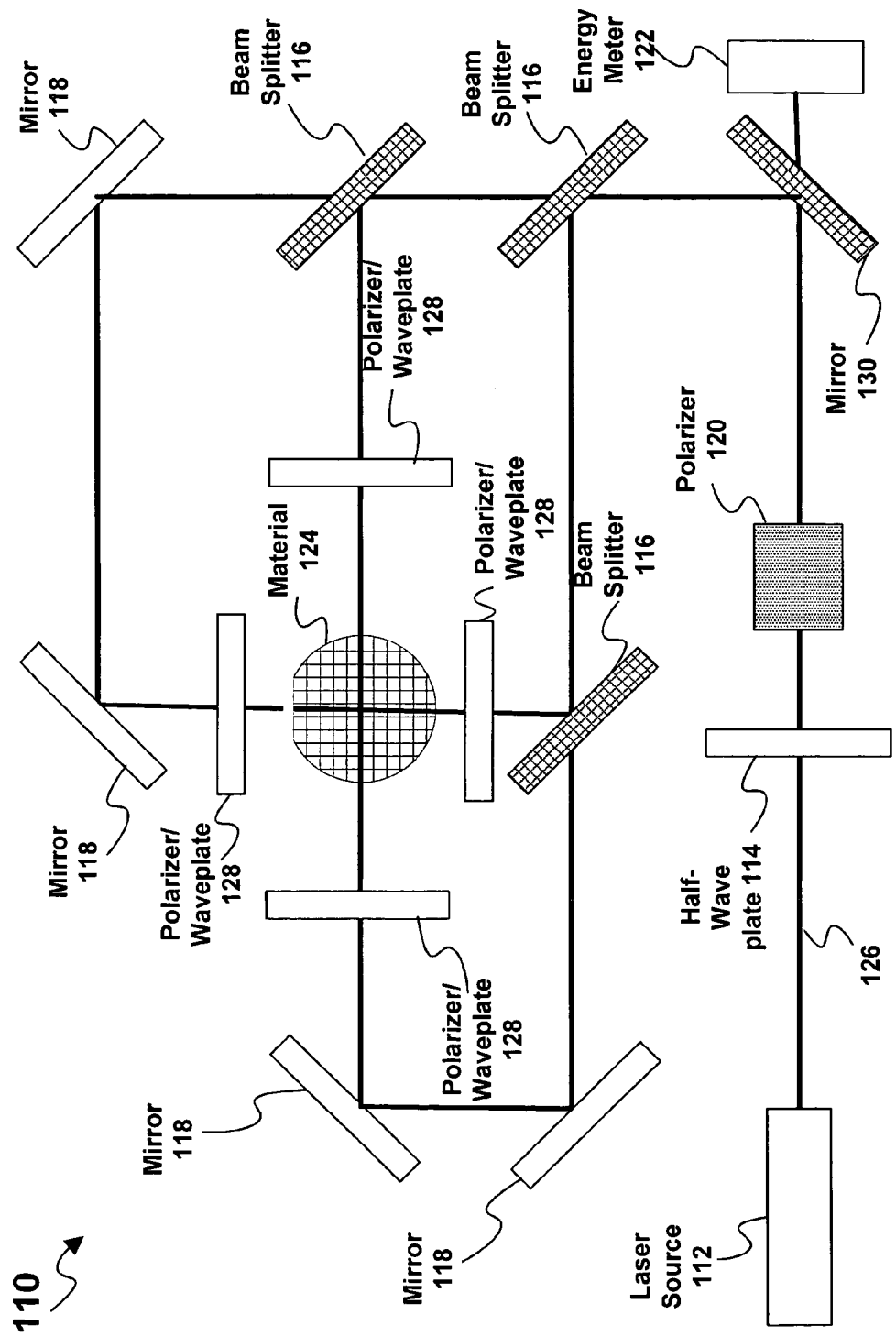
FIG. 2 illustrates one embodiment of a schematic of a laser holography system.
Figure 3:
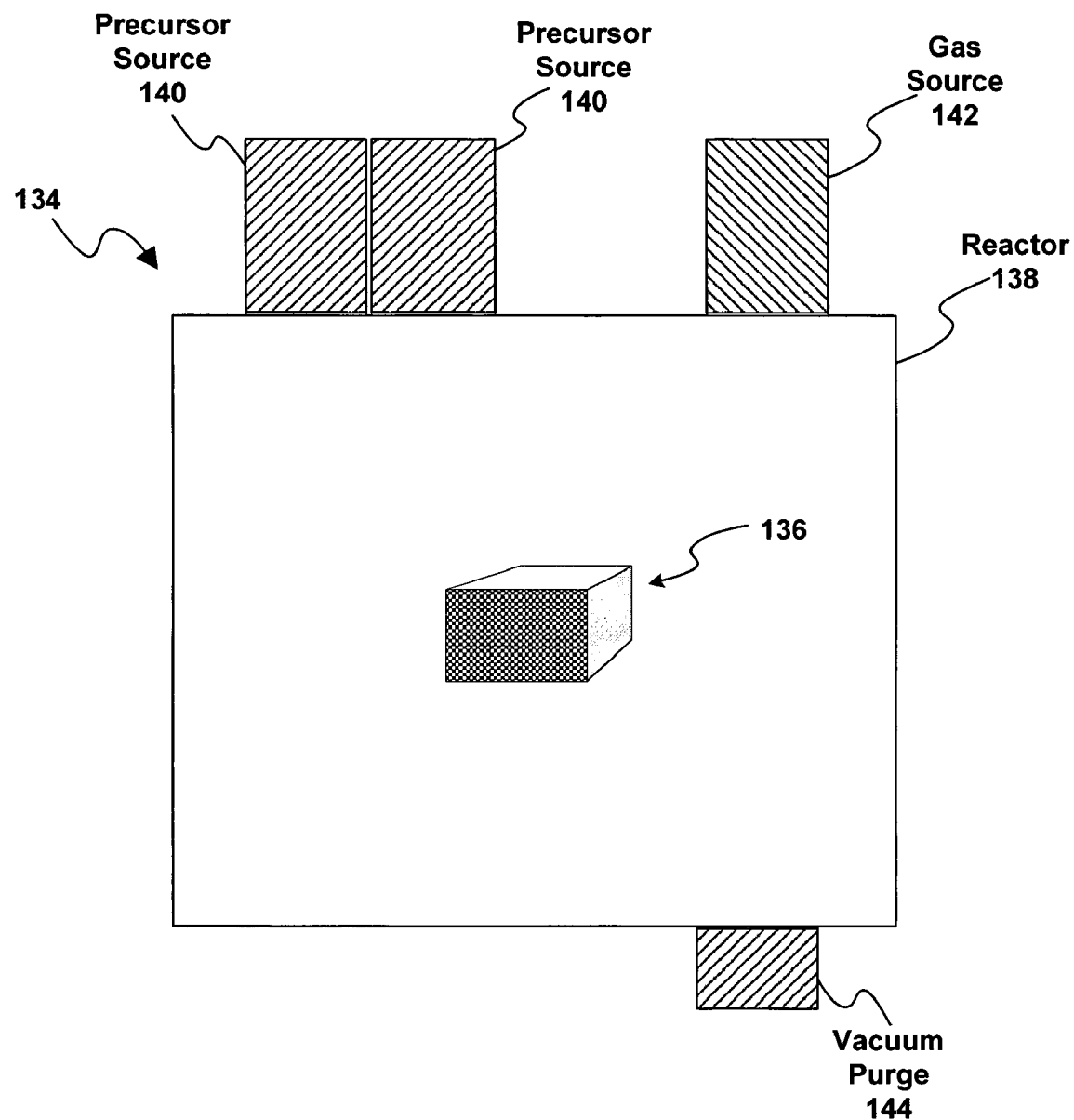
FIG. 3 illustrates one embodiment of a schematic of an atomic layer deposition system.

Illustrated in FIG. 2 is one embodiment of a holographic lithography system 110. System 110 comprises a laser source 112, a half-wave plate 114 and a polarizer or polarizing beam splitter 120, which may be capable of controlling overall laser intensity. System 110 may additionally include a mirror 130, which may comprise a 98% reflector to provide a feedback with energy meter 122, as just an example, a plurality of beam splitters 116, and a plurality of mirrors 118, combined with a plurality of polarizer/waveplates 128. Polarizer/waveplates 128 may comprise a physically distinct polarizer in combination with a waveplate, or may comprise a single integrated polarizer/waveplate, for example. The waveplate portions may comprise quarter or half waveplates, and may be configured to control polarization from incident beams, for example. In operation, system 110 may be capable of supplying or directing one or more beams of laser light 126 to material 124, which may comprise a photosensitive material. The production of laser light may result in two, three, or four beams being incident on one or more portions of material 124, and the beams may be pulsed, for example. As a result, portions of material 124 may be selectively exposed to electromagnetic radiation, such as due to laser interference of the multiple beams of laser light. This may enable removal of one or more portions of the material, such as the exposed or nonexposed portions, and the removal may be further enabled by developing at least a portion of the material. As a result, a 3D crystal structure may be formed, in at least one embodiment. Developing may comprise providing developer to at least a portion of the material, and at least a portion of the material may be removed. After being developed and subsequently removed, features such as internal and external surfaces may be formed from the material 124. The features may comprise nanostructures or microstructures, for example, and may define one or more arrays of voids, such as periodic, nonperiodic or a combination of periodic and nonperiodic arrays of voids. The features may have particular properties, such as high aspect ratios, for example. The features may be formed in one or more patterns, such as to form a periodic structure in one, two, or three dimensions.

System 110 may be comprised of numerous combinations of components, and selection of particular components may result in the formation of a system having particular capabilities. System 110 may be comprised of a laser source 112, and although numerous different types of laser sources may be utilized in a system such as system 110, including frequency converted solid-state lasers, gas lasers, and diode lasers, for example. Frequency converted solid-state lasers may utilize a particular laser source, in one embodiment, laser source 112 may be comprised of an injection-seeded, frequency tripled Q-switched Nd:YAG (neodymium-doped yttrium aluminum garnet) laser, for example, which may be capable of producing pulses of laser light having a wavelength of approximately 355 nanometers, although the claimed subject matter is not so limited. System 110 may additionally be comprised of the aforementioned optical components, which may, in operation, be capable of splitting, reflecting, or directing laser light such that the light is incident on material 124. For example, system 110 is comprised of a half-wave plate 114, which may be capable of altering the laser light 126, such as by controlling or altering the polarization of the laser light. Mirror 130 may be comprised of 98% reflector, may be capable of reflecting laser light 126, and may partially transmit laser light 126 to energy meter 122 to provide a feedback control of laser fluence, as just an example. Feedback of laser fluence may provide the capability of system 110, and more specifically laser source 112 to control the provided intensity of the laser, for example. Beam splitters 116 may be comprised of dielectric coatings, and may be capable of splitting laser light 126, such as into two or more laser beams. Mirrors 118 may comprise dielectric mirrors, and may be configured to reflect laser light, for example. Additionally, in at least one embodiment, one or more of the beam splitters 116, mirrors 118, and polarizers/waveplates 128 may be configured relative to material 124, such as equidistant, such as to cause two, three, or four beams of laser light to be incident on the material. The beams may have a similar intensity or the ratio of intensities, for example, and selection of intensities or ratios thereof may result in the formation of particular features. For example, a particular ratio of intensities may result in the formation of a device having isotropic or asymmetric properties, or may result in the formation of a device having a particular structure such as a face-centered cubic (fcc) structure, for example. Material 124 is illustrated as a wafer substrate with one or more materials disposed thereon, but the claimed subject matter is not so limited. However, in this embodiment, material 124 may comprise positive or negative photoresist materials including polymers and epoxies, such as SU8, an epoxy based photoresist material, such as SU8 disposed on a wafer substrate of silicon, glass, other semiconducting or transparent substrate, for example.

System 110 may be capable of producing, controlling and directing laser light numerous times, such as by producing, controlling or directing a number of pulses. The laser light may lithographically remove portions of material 124, resulting in the production of a crystal structure having particular features, such as a three-dimensional periodic structure having submicron periodicity. The crystal structure may be utilized to for a device at least in part, such as photonic crystal 100 of FIG. 1, for example, although photonic crystal 100 may be formed by utilizing one or more additional processes, explained in more detail hereinafter. Although numerous differing types and categories of materials may be utilized by a system such as system 110, in at least one embodiment, one or more photoresistive materials such as photosensitive polymer may be utilized. For example, as mentioned previously, material 124 may comprise the aforementioned SU8 material. The SU8 material may be capable of exhibiting relatively low intrinsic absorption for electromagnetic radiation having a wavelength of approximately 355 nm, and may be capable of sub-0.1 micron resolution, for example. Additionally, SU8 may have a degradation temperature of approximately 380 degrees Celsius, which may provide particular functionality during ALD processes. For example, ALD processes may be performed below the degradation temperature of SU8, and may be performed at approximately 325 degrees Celsius, for example. However, other types of materials may be utilized in at least one embodiment, including one or more types of photosensitive polymer materials, such as positive photoresist, for example, and the claimed subject matter is not so limited.

Referring now to FIG. 3, there is illustrated a system 134, which may comprise a schematic of an ALD system, for example. System 134 may comprise a system capable of forming a device by depositing multiple thin films by a plurality of self-limiting surface reactions that may utilize gas phase precursor materials such as to cause atomic level deposition, such as device 100 of FIG. 1, for example. System 134, in this embodiment, may be utilized to deposit multiple thin films on a device 136. Device 136 may comprise a device formed from material 124 of system 110 of FIG. 2, and may comprise a one, two or three-dimensional photonic crystal having submicron periodicity. Device 136 may be formed from one or a combination of materials, such as a combination of materials that may be layered, for example. System 134 may comprise a reactor 138, one or more precursor sources 140, which may comprise one or more gas phase precursor sources, and may contain differing precursors. Portions of system 134 may have the capability to be temperature controlled, such as the walls of reactor 138, a precursor manifold portion of system 134 (not shown) portions of device 136 and the purge gas of system 134, for example. System 134 may comprise gas source 142, which may comprise an inert gas source, and may additionally comprise a vacuum purge device 144. Purge device 144 may be capable of evacuating at least a portion of reactor 138, or may be capable of holding reactor 138 at a vacuum, for example.

In operation, a 2D or 3D crystal structure may be disposed within reactor 138. System 134 may be capable of depositing thin films of material on internal and external surfaces of the crystal structure by atomic layer deposition. The material may be deposited on at least a portion of the crystal structure surfaces, such as in the following manner: one or more precursor materials, which may be in gaseous form, may be introduced into reactor 138 by precursor sources 140. The introduction of precursor material may additionally be referred to as gas pulsing. The crystal structure, which may be heated to a particular temperature, for example, may be exposed to the precursor, such as by having one or more surfaces (including internal surfaces) of the crystal structure saturated with the material. Additionally, the walls of reactor 138 may be maintained at a particular temperature, such as a temperature below the decomposition temperature of the precursor material. As a result, after a period of exposure, the material may be deposited on one or more surfaces of the crystal structure, such as by being adsorbed to or reacting with the crystal structure surfaces, and the deposition may comprise atomic layer deposition. The material may form a thin film, such as a monolayer on the external and internal surfaces of the crystal structure, for example. Gas, such as from gas source 142, may be temperature controlled, and may be introduced to the reactor 138. Reactor 138 may be substantially purged with the gas, which may comprise an inert gas including argon, for example. The reactor 134 may additionally be evacuated by vacuum purge device 144 and purged with inert gas, or may be evacuated and purged, for example. Alternatively, the purging of the reactor with inert gas may be continuous, such as continuous through the deposition processes, for example. The cycle of providing precursor gas (gas pulsing) and gas purging/evacuating may be repeated one or more times, such as to form a plurality of layers of material on to one or more surfaces of the crystal structure, such as one or more conformal layers of material, for example. This may result in the formation of one or more films on the crystal structure (internal and external) surfaces, wherein the one or more films may be formed to have a substantially uniform thickness. The one or more films may be formed from a plurality of material layers, and may be formed to a relatively uniform thickness on features of the crystal structure having high aspect ratios, for example. Thus, a photonic crystal device having one or more desired properties, such as optical properties may be formed.

Although numerous differing types and categories of materials exist that may be utilized as part of system 134, and the claimed subject matter is not so limited, in at least one embodiment, one or more materials that may be deposited by system 134 may comprise one or more metals, metal oxides, metal nitrides, II–VI compounds, or III–IV compounds, such as GaAs, InP, InAs, ZnS, CdS, CdTe, W, $W_2N$, TaN, $Ta_2O_5$, or $TiO_2$, for example. However, other materials may be utilized, such as materials providing a refractive index constant that may enable formation of a photonic crystal that may exhibit a band gap in the visible, IR, microwave or other wavelength regions, for example. For the deposition of these materials by ALD on device 136 one or more precursor materials may be sequentially delivered individually to system 134 from precursor source 140 by pulsing, followed by purging of system 134 by gas source 142 or evacuation of system 134 by vacuum purge 144. For example, in the deposition of W by ALD on a device, a metal precursor (e.g., $WF_6$ or $W(CO_3)$) that may be in gaseous form, for example may be pulsed to expose the substrate; evacuation or purging on the metal precursor and reaction by-products from the system may be performed; the substrate may be exposed to another reactant (e.g., $B_2H_6$, $SiH_4$, $Si_2H_6$) that may be in gaseous form, for example; evacuation or purging of the precursor and reaction by-products from the system may be performed. Purge materials may comprise, for example, Ar, $N_2$, or other inert gases. System 134 may be capable of heating the reactor, the precursor materials, the purge materials, or one or more devices disposed therein to one or more temperatures. For example, temperatures within the range of approximately 150–400 degrees Celsius may be utilized, although the claimed subject matter is not so limited, and temperatures may depend at least in part on the precursor or purge materials, for example. In at least one embodiment, a device may comprise a crystal structure that was formed at least in part by system 110 of FIG. 2, and the crystal structure may substantially comprise SU8, for example. The device may be disposed within reactor 138, and system 134 may be capable of depositing one or more films on surfaces (including internal surfaces) of the crystal structure, such as a film comprising W. The one or more films may be deposited to a particular thickness, and thickness may depend at least in part on the one or more materials utilized to form the films. For example, W may be deposited to a substantially uniform thickness of 2–5 Angstroms per each deposition process or gas pulse. However, one or more thin films may be deposited to submicron or micron thicknesses, such as between 0.5–5 Angstroms, for example. A plurality of gas pulses may be utilized such as to form a device having one or more properties, such as one or more features of a particular thickness that may provide one or more optical properties, and may comprise a 3D photonic crystal, for example.

Figure 4:
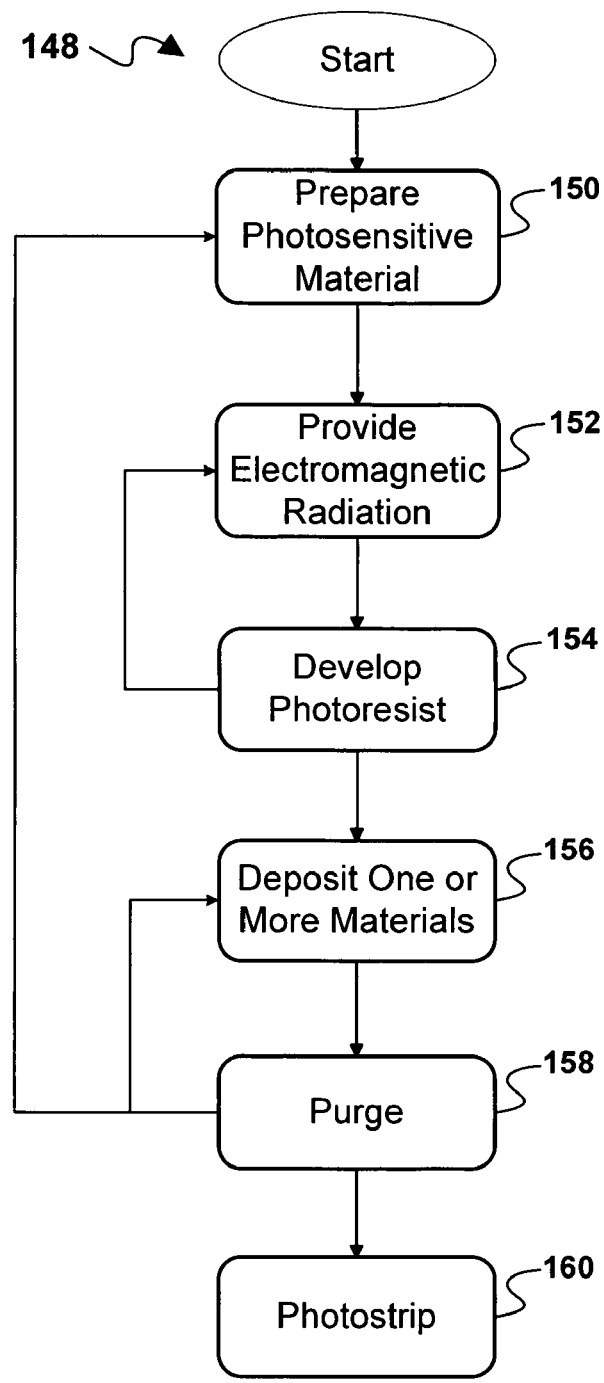
FIG. 4 is a flowchart illustrating an embodiment of a method to form a photonic crystal.

Formation of one or more portions of the devices as illustrated in the accompanying figures may comprise one or more processes, or numerous process operations, but claimed subject matter is not limited to any particular method of formation. Referring now to FIG. 4, one embodiment of a technique for forming a device is illustrated by a flowchart 148. Such an embodiment may be employed to at least partially form a photonic crystal device, as described below. Likewise, the order in which the blocks are presented does not necessarily limit claimed subject matter to any particular order. Additionally, intervening blocks not shown may be employed without departing from the scope of claimed subject matter.

Flowchart 148 depicted in FIG. 4 may, in alternative embodiments, be implemented in a combination of hardware, software and firmware, such as part of one or more systems capable of forming one or more portions of a photonic crystal device, such as a holographic lithography system and an ALD system. Flowchart 148 may comprise discrete or continual operations. In this embodiment, at block 150, a photosensitive material may be prepared. At block 152, a system capable of producing electromagnetic radiation, such as a holographic lithography system, may provide electromagnetic radiation to one or more portions of the photosensitive material. The electromagnetic radiation may be delivered as one or more laser beams to multiple portions of the photosensitive material, and the laser beams may cause at least a portion of the photosensitive material to be exposed.

At block 154, the photosensitive material may be developed, such as by applying a suitable developer. Developers may depend on the particular photosensitive material, and one or more developers known in the art may be utilized in at least one embodiment. Developing may additionally comprise lithographically removing exposed or non-exposed portions of the photosensitive material to form (or partially form) a 3D crystal structure. The 3D crystal structure may comprise internal and external surfaces that define one or more voids such as a periodic arrangement of voids. The providing of block 152 and the developing of block 154 may be repeated a number of times, such as indicated by the feedback loop so as to fully form the 3D crystal structure. At block 156, the formed crystal structure may be provided to a system, such as an ALD system, capable of depositing thin layers of one or more materials. One or more materials may be deposited on portions of the crystal structure, such as one or more surfaces of the crystal structure. At block 158, the system may be purged or evacuated, which may comprise purging with one or more inert gases and evacuating with a vacuum, for example. One or more additional materials may be deposited on surfaces of the crystal structure, such as by repeating the depositing and purging/evacuating a plurality of times, as indicated by the feedback loop. The depositing of block 156 and purging/evacuating operations of block 158 may be repeated a plurality of times, such as to form one or more thin layers of material on one or more surfaces (including internal surfaces) of the crystal structure. The resultant device may include a photonic crystal device, such as photonic crystal 100, including one or more ALD deposited thin films. In at least one embodiment, at block 160, one or more portions of the formed device may be photostripped, which may result in residual material, such as photosensitive material being removed from the device, for example.

As previously noted, at block 150, a photosensitive material may be prepared. Preparing may comprise forming the photosensitive material to have particular dimensions, for example. At blocks 152 and 154, one or more portions of a material may be selectively removed, such as by exposing portions of the material to electromagnetic radiation and developing the exposed or unexposed portions, depending on the material. Selective exposure and development may be performed by a holographic lithography process, for example. In at least one embodiment, system 110 of FIG. 2 may be utilized to perform the operations of blocks 152 and 154, and in this embodiment, the photosensitive material may comprise SU8. A laser, such as a Nd:YAG laser may provide laser light, and a plurality of polarizers, quarter-wave plate, half-wave plates, mirrors or beam splitters may cause the laser light to be split or incident on to the photosensitive material, such as to lithographically expose one or more portions, such as to form one or more features, such as internal and external surfaces that may define voids. The photosensitive material may be developed, such as by providing the material with a developer and removing portions of the material, such as exposed or nonexposed portions, for example. The operations may be repeated one or more times to form a 3D crystal structure.

At blocks 156–160, a crystal structure formed by the holographic lithography system may be provided with one or more materials, such as to cause the one or more materials to be deposited on one or more surfaces of the crystal structure. In at least one embodiment, system 134 of FIG. 3 may be utilized to perform the operations of blocks 156–160, for example. In this embodiment, a crystal structure comprising SU8 may be provided to reactor 138. Precursor sources 140 may provide one or more precursor gases, such as sequentially, and the reactor may be purged by gas source 142, and may be vacuum evacuated between the providing of precursor gases, for example. In at least one embodiment, the reactor may be completely purged between precursor deposition operations, such as to prevent gas-phase reactions that may result from utilizing reactive gases, in sequential deposition operations, for example. Additionally, one or more adhesion materials may be provided prior to the precursor materials, depending on the particular materials being utilized, for example. This may result, for example, in the formation of one or more thin films of material on to one or more surfaces of the crystal structure, for example. The one or more films may be formed to a substantially uniform thickness, which may be on the order of tens to hundreds of nanometers, or ranging from submicron to micron dimensions. Furthermore, the thin films may fill up the one or more voids defined by the surfaces of the crystal structure, in at least one embodiment. For example, an ALD process may be capable of depositing material layers at a thickness within the range of approximately 0.5 to 5 Angstroms per gas pulse operations, and a plurality of gas pulse operations may be performed to produce features with a desired thickness, for example. The thicknesses of the one or more films may depend at least in part on the dimensions of the crystal structure, and may additionally depend on the particular desired optical properties of the resulting photonic crystal, for example. The thin films may be formed on features formed in the crystal structure having relatively high aspect ratios, as just an example. Alternatively, one or more removal processes may subsequently be performed on at least a portion of the photosensitive material such as to remove a portion of the photosensitive material that was lithographically etched at blocks 152 and 154. For example, portions of the photosensitive material, may be removed by plasma ashing or high temperature degradation processes. However, the claimed subject matter is not limited in this respect.

It is now appreciated, based at least in part on the foregoing disclosure, that a combination of hardware and software or firmware may be produced capable of forming the one or more devices described herein. It will additionally be understood that, although particular embodiments have just been described, claimed subject matter is not limited in scope to a particular embodiment or implementation. For example, a formation system capable of implementing one or more of the foregoing operations may comprise hardware, such as implemented to operate on a device or combination of devices as previously described, for example, whereas another embodiment may be in software and hardware, for example. Likewise, an embodiment of a system capable of implementing one or more of the abovementioned operations may be implemented in firmware, or as any combination of hardware, software and firmware, for example. Additionally, all or a portion of one embodiment may be implemented to operate at least partially in one device, such as an electromagnetic radiation device, an ALD device, a display, a computing device, for example. Likewise, although claimed subject matter is not limited in scope in this respect, one embodiment may comprise one or more articles, such as a storage medium or storage media. This storage media, such as, one or more CD-ROMs or disks, for example, may have stored thereon instructions, that when executed by a system, such as a system as described above, may result in a method in accordance with claimed subject matter being executed, such as one of the methods previously described, for example. As one potential example, a computing platform may include one or more processing units or processors, one or more input/output devices, such as a display, a keyboard or a mouse, or one or more types of memory, such as static random access memory, dynamic random access memory, flash memory, or a hard drive, although, again, claimed subject matter is not limited in scope to this example.

In the preceding description, various aspects of claimed subject matter have been described. For purposes of explanation, specific numbers, systems or configurations were set forth to provide a thorough understanding of claimed subject matter. However, it should be apparent to one skilled in the art having the benefit of this disclosure that claimed subject matter may be practiced without the specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A photonic crystal, comprising:
   a material with a three-dimensional lattice arrangement of periodic submicron features formed therein spaced from each other in three orthogonal directions, at least a portion of the periodic features comprising internal surfaces forming a three-dimensional lattice arrangement of voids; and
   one or more thin films deposited on a substantial portion of the features, wherein at least a portion of the one or more thin films is deposited on the internal surfaces to a substantially uniform thickness.

2. The photonic crystal of claim 1, wherein the one or more thin films is deposited on a substantial portion of the internal surfaces.

3. The photonic crystal of claim 2, wherein at least a portion of the one or more thin films comprises one or more of: metals, metal oxides, metal nitrides, II–VI compounds, III–IV compounds including GaAs, InP, InAs, ZnS, CdS, CdTe, W, W2N, TaN, Ta2O5, TiO2, or combinations thereof.

4. The photonic crystal of claim 2, wherein the material substantially comprises SU8, and wherein at least a portion of the one or more thin films substantially comprises W, formed to a substantially uniform thickness within the range of 2–5 Angstroms.

5. The photonic crystal of claim 1, wherein at least a portion of the one or more thin films substantially fills at least a portion of the one or more voids.

6. The photonic crystal of claim 1, wherein said material comprises one or more of: polymer materials and epoxy materials.

7. The photonic crystal of claim 1, wherein at least a portion of the one or more thin films comprise comprises monolayers, submonolayers, or multilayers.

8. The photonic crystal of claim 1, wherein at least a portion of the one or more thin films comprises a plurality of atomic or subatomic layers of material.

9. The photonic crystal of claim 1, wherein at least a portion of the one or more thin films comprises metal.

10. The photonic crystal of claim 1, wherein the one or more films integrally extend as a single unitary body in three dimensions across the lattice arrangement of voids.

11. The photonic crystal of claim 10, wherein the one or more films integrally extend as a single unitary body from a first side to a second side of the lattice arrangement in a first direction, from a third side to a fourth side of the lattice arrangement in a second direction orthogonal to the first direction and from a fifth side to a sixth side of the lattice arrangement in a third direction orthogonal to the first direction and orthogonal to the second direction.

12. The photonic crystal of claim 1, wherein the three-dimensional lattice arrangement of voids are connected to continuously extend through the three-dimensional lattice arrangement of periodic submicron features from a first side to a second side of the lattice arrangement of features in a first direction, from a third side to a fourth side of the lattice arrangement of features in a second direction orthogonal to the first direction and from a fifth side to a sixth side of the lattice arrangement of features in a third direction orthogonal to the first direction and orthogonal to the second direction.

13. A method, comprising:
   selectively removing one or more portions of a material by use of one or more holographic exposure processes and one or more developing processes to form a plurality of features spaced from each other in three orthogonal directions, at least a portion of the plurality of features comprising internal surfaces defining a lattice arrangement of voids;
   depositing one or more thin films on at least a portion of the features by use of one or more deposition processes to form at least a portion of a photonic device.

14. The method of claim 13, and further comprising depositing one or more thin films such as to substantially fill at least a portion of the lattice arrangement of voids.

15. The method of claim 13, wherein the holographic process utilizes a laser source substantially comprising a solid state laser, a gas laser, or a semiconductor laser.

16. The method of claim 13, wherein the material comprises one or more of: photosensitive polymer materials and photosensitive epoxy materials.

17. The method of claim 13, wherein the depositing is substantially performed by an atomic layer deposition (ALD) system.

18. The method of claim 13, wherein at least a portion of the one or more thin films comprise monolayers, submonolayers, or multilayers.

19. The method of claim 13, wherein at least a portion of the one or more thin films comprises atomic or subatomic layers of material.

20. The method of claim 13, wherein at least a portion of the one or more thin films comprises metal.

21. The method of claim 13, wherein at least a portion of the one or more thin films comprises one or more of: metals, metal oxides, metal nitrides, II–VI compounds, III–IV compounds including GaAs, InP, in As, ZnS, CdS, CdTe, W, W2N, TaN, Ta2O5, TiO2, or combinations thereof.

22. The method of claim 13, wherein the material substantially comprises SU8, and wherein at least a portion of the one or more thin films substantially comprises W, formed to a substantially uniform thickness within the range of 2–5 Angstroms.

23. The method of claim 13, wherein the one or more films integrally extend as a single unitary body in three dimensions across the lattice arrangement of voids.

24. The method of claim 23, wherein the one or more films integrally extend as a single unitary body from a first side to a second side of the lattice arrangement of voids in a first direction, from a third side to a fourth side of the lattice arrangement of voids in a second direction orthogonal to the first direction and from a fifth side to a sixth side of the lattice arrangement of voids in a third direction orthogonal to the first direction and orthogonal to the second direction.

25. The method of claim 13, wherein the lattice arrangement of voids are connected to continuously extend through the plurality of features from a first side to a second side of the plurality of features in a first direction, from a third side to a fourth side of the features in a second direction orthogonal to the first direction and from a fifth side to a sixth side of the plurality of features in a third direction orthogonal to the first direction and orthogonal to the second direction.

26. A method of manufacturing a photonic crystal, comprising:
   a step for selectively removing one or more portions of a photosensitive material by use of one or more holographic lithography processes to form one or more features of the photonic crystal, wherein the one or more features form voids and are spaced from one another in three orthogonal directions;
   a step for depositing one or more thin films on at least a portion of the one or more features by use of one or more atomic layer deposition processes.

27. The method of claim 26, wherein the one or more films integrally extend as a single unitary body in three dimensions across the lattice arrangement of voids.

28. The method of claim 27, wherein the one or more films integrally extend as a single unitary body from a first side to a second side of the lattice arrangement of voids in a first direction, from a third side to a fourth side of the lattice arrangement of voids in a second direction orthogonal to the first direction and from a fifth side to a sixth side of the lattice arrangement of voids in a third direction orthogonal to the first direction and orthogonal to the second direction.

29. The method of claim 26, wherein the lattice arrangement of voids are connected to continuously extend through the plurality of features from a first side to a second side of the plurality of features in a first direction, from a third side to a fourth side of the plurality of features in a second direction orthogonal to the first direction and from a fifth side to a sixth side of the plurality of features in a third direction orthogonal to the first direction and orthogonal to the second direction.

30. A method comprising:
   forming a first material on a substrate;
   removing at least a portion of the first material from the substrate, by use of one or more holographic lithography processes, to form a three dimensional crystal structure having a lattice arrangement of features integral as a single unitary body and spaced from each other in three orthogonal directions, the features having internal surfaces forming a lattice arrangement of voids;
   depositing a second material on at least a portion of the internal surfaces by use of one or more atomic layer deposition (ALD) processes to form a film integrally extending as a single unitary body in three dimensions across the lattice arrangement of voids; and
   repeating the depositing step such as to form a plurality of thin films on at least a portion of the internal surfaces.

31. The method of claim 30, wherein the holographic lithography process utilizes a laser source substantially comprising a Nd:YAG laser source.

32. The method of claim 30 wherein the first material comprises one or more of: photosensitive polymer materials and photosensitive epoxy materials.

33. The method of claim 30, wherein least a portion of the plurality of thin films comprise monolayers, submonolayers, or multilayers.

34. The method of claim 30, wherein at least a portion of the plurality of thin films comprise one or more of: metals, metal oxides, metal nitrides, II–VI compounds, III–IV compounds including GaAs, InP, InAs, ZnS, CdS, CdTe, W, W2N, TaN, Ta2O5, TiO2, or combinations thereof.

35. The method of claim 30, wherein the first material substantially comprises SU8, and wherein the plurality of thin films substantially comprise W, formed to a substantially uniform thickness within the range of 2–5 Angstroms.

36. A method of making a photonic crystal, comprising the steps of:
   a) providing a substrate,
   b) forming a first material on the substrate,
   c) removing at least a portion of the first material from the substrate by use of one or more holographic lithography processes to form a three dimensional crystal structure having internal surfaces forming voids formed by features that are spaced from each other in three orthogonal directions,
   d) depositing a second material on at least a portion of the internal surfaces by use of one or more atomic layer deposition processes, and
   e) repeating the depositing step to form a plurality of thin films on at least a portion of the internal surfaces.

37. The method of claim 36, wherein the holographic lithography process utilizes a laser source substantially comprising a solid state laser, a gas laser, or a semiconductor laser.

38. The method of claim 36, wherein the one or more features comprise voids formed in a lattice arrangement.

39. The method of claim 36, wherein photosensitive material comprises one or more of: photosensitive polymer materials and photosensitive epoxy materials.

40. The method of claim 36, wherein at least a portion of the one or more thin films comprise monolayers, submonolayers, or multilayers.

41. The method of claim 36, wherein at least a portion of the one or more thin films comprises atomic or subatomic layers of material.

42. The method of claim 36, wherein at least a portion of the one or more thin films comprise one or more of: metals, metal oxides, metal nitrides, II–VI compounds, III–IV compounds including GaAs, InP, InAs, ZnS, CdS, CdTe, W, W2N, TaN, Ta2O5, TiO2, or combinations thereof.

43. The method of claim 36, wherein the photosensitive material substantially comprises SU8, and a plurality of thin films are formed, wherein the plurality of thin films substantially comprise W, formed to a substantially uniform thickness within the range of 2–5 Angstroms.

44. The method of claim 36, wherein the three-dimensional crystal structure has a lattice arrangement of voids connected to continuously extend through the plurality of features from a first side to a second side of the first material in a first direction, from a third side to a fourth side of the first material in a second direction orthogonal to the first direction and from a fifth side to a sixth side of the first material in a third direction orthogonal to the first direction and orthogonal to the second direction. wherein the one or more films integrally extend as a single unitary body from the first side to the second side of the lattice arrangement of voids in the first direction, from the third side to the fourth side of the lattice arrangement of voids in the second direction orthogonal to the first direction and from the fifth side to the sixth side of the lattice arrangement of voids in the third direction orthogonal to the first direction and orthogonal to the second direction.

45. A photonic crystal, comprising:
   a material with a plurality of lithographically defined periodic features formed therein, at least a portion of the periodic features comprising internal surfaces; and one or more thin films deposited on a substantial portion of the features, wherein the one or more thin films is deposited on a substantial portion of the internal surfaces and wherein at least a portion of the one or more thin films is deposited on the internal surfaces to a substantially uniform thickness, wherein the material substantially comprises SU8, and wherein at least a portion of the one or more thin films substantially comprises W, formed to a substantially uniform thickness within the range of 2-5 Angstroms.

* * * * *

UNITED STATES PATENT AND TRADEMARK OFFICE
CERTIFICATE OF CORRECTION

| | | |
|---|---|---|
| PATENT NO. | : 7,389,023 B2 | Page 1 of 1 |
| APPLICATION NO. | : 11/082024 | |
| DATED | : June 17, 2008 | |
| INVENTOR(S) | : Jong-Souk Yeo et al. | |

It is certified that error appears in the above-identified patent and that said Letters Patent is hereby corrected as shown below:

In column 11, line 42, in Claim 3, delete "W2N, TaN, Ta2O5, TiO2," and insert -- $W_2N$, TaN, $Ta_2O_5$, $TiO_2$, --, therefor.

In column 11, line 55, in Claim 7, after "films" delete "comprise".

In column 12, line 50, in Claim 21, delete "in As," and insert -- InAs, --, therefor.

In column 12, line 51, in Claim 21, delete "W2N, TaN, Ta2O5, TiO2," and insert -- $W_2N$, TaN, $Ta_2O_5$, $TiO_2$, --, therefor.

In column 13, line 62, in Claim 33, delete "least" and insert -- at least --, therefor.

In column 14, line 2, in Claim 34, delete "W2N, TaN, Ta2O5, TiO2," and insert -- $W_2N$, TaN, $Ta_2O_5$, $TiO_2$, --, therefor.

In column 14, line 40, in Claim 42, delete "W2N, TaN, Ta2O5, TiO2," and insert -- $W_2N$, TaN, $Ta_2O_5$, $TiO_2$, --, therefor.

In column 14, line 54, in Claim 44, after "direction" delete "." and insert -- , --, therefor.

Signed and Sealed this

Eleventh Day of November, 2008

JON W. DUDAS
*Director of the United States Patent and Trademark Office*